(12) United States Patent
Cao et al.

(10) Patent No.: US 11,880,082 B2
(45) Date of Patent: Jan. 23, 2024

(54) PRECONNECTORIZED OPTICAL DISTRIBUTION CABLE ASSEMBLIES AND CORRESPONDING METHODS OF DEPLOYMENT

(71) Applicant: CORNING RESEARCH & DEVELOPMENT CORPORATION, Corning, NY (US)

(72) Inventors: Songhua Cao, Shanghai (CN); Xu Li, Shanghai (CN); Wei Liu, Shanghai (CN); Peiyou Xiong, Shanghai (CN); Shun Sheng Zhou, Shanghai (CN)

(73) Assignee: Corning Research & Development Corporation, Corning, NY (US)

(*) Notice: Subject to any disclaimer, the term of this patent is extended or adjusted under 35 U.S.C. 154(b) by 0 days.

(21) Appl. No.: 17/723,789

(22) Filed: Apr. 19, 2022

(65) Prior Publication Data

US 2022/0350104 A1    Nov. 3, 2022

(51) Int. Cl.
*G02B 6/44* (2006.01)

(52) U.S. Cl.
CPC ......... *G02B 6/4475* (2013.01); *G02B 6/4472* (2013.01)

(58) Field of Classification Search
None
See application file for complete search history.

(56) References Cited

U.S. PATENT DOCUMENTS

| | | | |
|---|---|---|---|
| 6,522,814 B2 | 2/2003 | Yoshida et al. | |
| 7,006,739 B2 | 2/2006 | Elkins et al. | |
| 7,346,243 B2 | 3/2008 | Cody et al. | |
| 7,495,175 B2 | 2/2009 | Pluister | |
| 7,588,216 B1 | 9/2009 | Hoyl et al. | |
| 10,371,917 B2 | 8/2019 | Cooke et al. | |
| 11,209,604 B2 | 12/2021 | Yokokawa et al. | |
| 2004/0062496 A1 | 4/2004 | Shuman et al. | |
| 2006/0093278 A1* | 5/2006 | Elkins | G02B 6/4473 385/86 |
| 2008/0080818 A1 | 4/2008 | Cobb et al. | |
| 2008/0181570 A1* | 7/2008 | Mullaney | G02B 6/4475 385/135 |
| 2010/0150504 A1* | 6/2010 | Allen | G02B 6/3825 385/100 |
| 2016/0103290 A1* | 4/2016 | Loeffelholz | G02B 6/4475 385/100 |
| 2020/0341220 A1* | 10/2020 | Yokokawa | G02B 6/3873 |

FOREIGN PATENT DOCUMENTS

| | | |
|---|---|---|
| CN | 101887153 A | 11/2010 |
| CN | 201749240 U | 2/2011 |
| CN | 103792631 A | 5/2014 |
| CN | 204010746 U | 12/2014 |
| CN | 216160878 U | 4/2022 |

(Continued)

OTHER PUBLICATIONS

European Patent Application No. 22170279.8, Extended European Search Report dated Oct. 25, 2022, 9 pages; European Patent Office.

*Primary Examiner* — Jerry Rahll

(74) *Attorney, Agent, or Firm* — Adam R. Weeks

(57) ABSTRACT

The present disclosure relates to a distribution cable assembly that has various features to enable flexible configurations to accommodate various data center configurations.

24 Claims, 12 Drawing Sheets

(56) References Cited

FOREIGN PATENT DOCUMENTS

| | | |
|---|---|---|
| EP | 0038861 A1 | 11/1981 |
| JP | 63-173008 A | 7/1988 |
| JP | 2000-258672 A | 9/2000 |
| JP | 2001-116968 A | 4/2001 |
| JP | 3156316 U | 12/2009 |
| WO | 2000/065610 A1 | 11/2000 |
| WO | 2008/120623 A1 | 10/2008 |
| WO | 2020/214762 A1 | 10/2020 |

\* cited by examiner

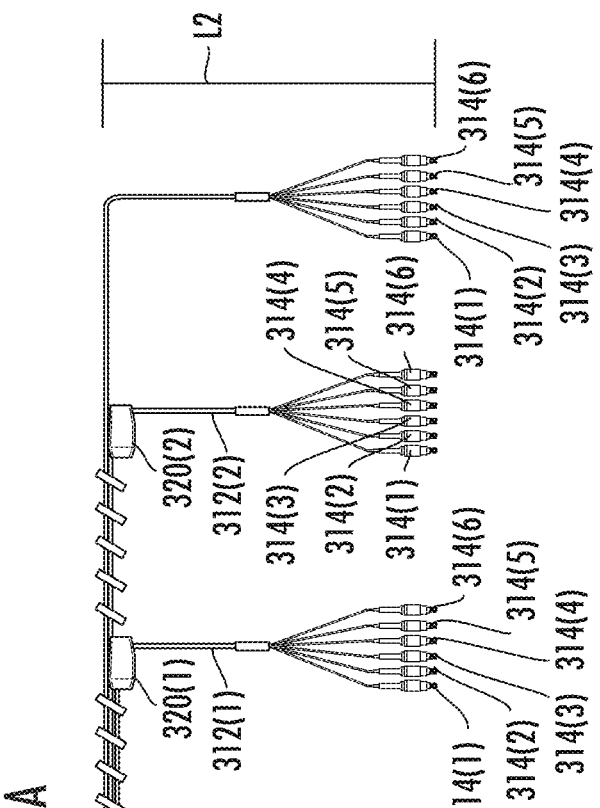
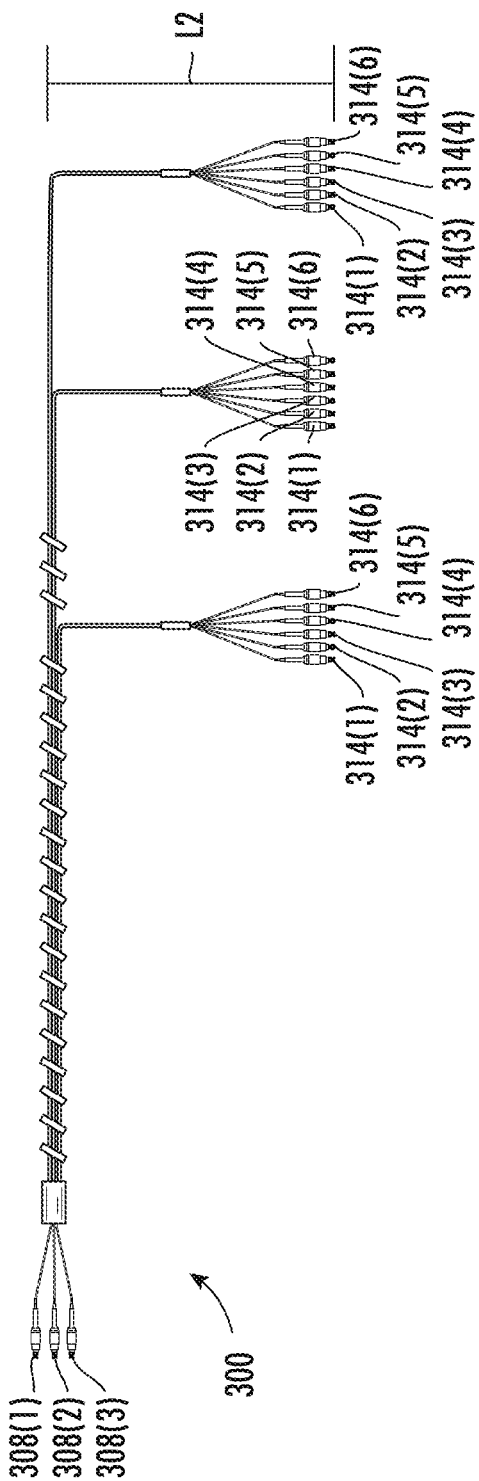
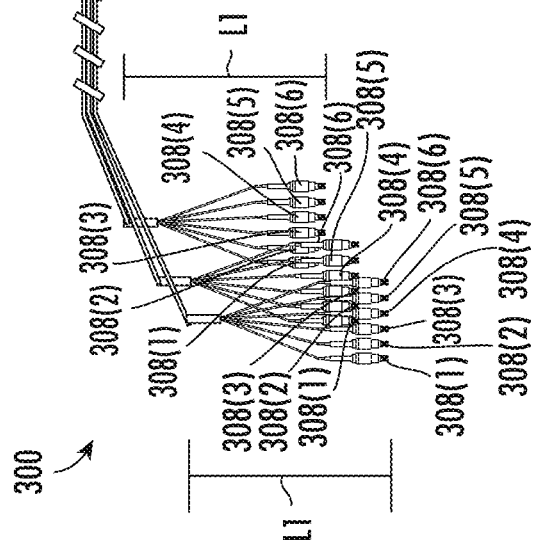
FIG. 10A
FIG. 10B

PRECONNECTORIZED OPTICAL DISTRIBUTION CABLE ASSEMBLIES AND CORRESPONDING METHODS OF DEPLOYMENT

PRIORITY APPLICATION

This application claims the benefit of priority of International Application No. PCT/CN21/90996, filed on Apr. 29, 2021, the content of which is relied upon and incorporated herein by reference in its entirety.

FIELD OF THE DISCLOSURE

This disclosure relates to preconnectorized optical distribution cable assemblies, and in particular, relates to preconnectorized optical distribution cable assemblies design and deployment capability.

BACKGROUND OF THE DISCLOSURE

Data center design and cabling-infrastructure architecture are increasingly large and complex, which requires incorporation of high-density optical components (e.g., optical fiber densities), such as to compensate for limited space and meet increasing performance demands. Many data centers include fiber optic cables, which have a number of advantages in waveguide systems compared to bulky traditional conductor cables (e.g., copper). Fiber optic cables provide wide bandwidth data transmission, transport multiple signals and traffic types, and/or deliver high-speed Internet access, especially as data rates increase. Data centers utilize multifiber cables to interconnect and provide signals between building distribution frames and/or to individual unit centers (e.g., computer servers). However, the labor and cost of deploying such multi-fiber cable networks for a data center can be high. Thus, there is a desire to reduce the time and costs associated with data center construction, particularly regarding cabling installation.

One way to improve optical infrastructure installation efficiency is to pre-engineer infrastructure components. Such components (e.g., fiber optic cables) may be preterminated in a factory with connectors installed, tested, and packaged for fast, easy, and safe installation at a data center. In this way, the installer merely needs to unpack the components, pull or route the preconnectorized fiber optic cable assembly, snap-in connectors, and/or install patch cords to end equipment, etc. This saves a significant amount of time, effort, and costs compared to on-site connectorization and assembly of cables.

However, data center configurations vary, and there is a need to improve upon the flexibility of the infrastructure components to accommodate different data center configurations. Stated another way, a need remains in the art to continue to improve upon installation efficiency of the infrastructure components to accommodate different data center configurations.

SUMMARY OF THE DISCLOSURE

The present disclosure relates to a distribution cable assembly that has various features to enable flexible configurations to accommodate various data center configurations.

In one embodiment, a distribution cable assembly is provided. The distribution cable assembly, comprising: a distribution cable having a distribution end and a plurality of subunit cables within the distribution cable; a plurality of tap points positioned along a length of the distribution cable, wherein the plurality of tap points are each configured to route one of the plurality of subunit cables away from a remainder of the plurality of subunit cables to form a respective tap cable and the plurality of tap points are spaced apart in a first configuration; wherein the plurality of tap points are adjustable such that the plurality of tap points are spaced apart in a second configuration that is different than the first configuration.

In an alternate embodiment, the plurality of tap points are adjustable such that a first quantity of the plurality of tap points is changed to a second quantity of the plurality of tap points, wherein the second quantity is different than the first quantity. In an alternate embodiment, each tap point of the plurality of tap points comprises a first half and a second half, wherein the first half and the second half couple to each other in a snap fit configuration to define a main passage and a drop cable passage separated by an interior wall. In an alternate embodiment, each tap point of the plurality of tap points includes a first aperture, a second aperture, and a third aperture wherein the first aperture and the second aperture define the main passage, and wherein the third aperture and the interior wall define the drop cable passage. In an alternate embodiment, the distribution cable assembly further including a first grommet applied onto edges of the first aperture and a second grommet applied onto edges of the second aperture. In an alternate embodiment, the distribution cable assembly further including a third grommet applied onto edges of the third aperture. In an alternate embodiment, the distribution cable assembly further including a boot assembly extending through the third aperture and into the drop cable passage. In an alternate embodiment, each tap point of the plurality of tap points routes a respective subunit cable to form a respective a tap cable, and wherein each tap cable has a respective length. In an alternate embodiment, at least one of the respective lengths of the tap cables are different with respect to the respective length of another tap cable. In an alternate embodiment, the distribution cable assembly further comprises: a pulling grip positioned between the distribution end and the plurality of tap points. In an alternate embodiment, the distribution cable comprises a mesh material having perforations through which at least one subunit cable of the plurality of subunit cables is fed through.

In one embodiment, a tap point assembly is provided. The tap point assembly comprising: a tap point comprising: a first half; a second half coupled to the first half in a snap fit configuration to define an interior of the tap point; a main passage defined by the first half and the second half, wherein the main passage terminates at a first aperture and a second aperture; an interior wall within the interior of the tap point, the interior wall defining a drop cable passage terminating at a third aperture; a distribution cable seated in the main passage from the first aperture to the second aperture, wherein the distribution cable includes at least one subunit cable within an interior of the distribution cable; and a tap cable exiting the third aperture of the tap point, wherein the tap cable is formed by a subunit cable of the at least one subunit cable that is extracted from the distribution cable and seated within the drop cable passage.

In an alternate embodiment, wherein the tap point assembly is movable along a longitudinal axis of the distribution cable. In an alternate embodiment, the distribution cable comprises a mesh material and having a perforation through which the subunit cable that forms the tap cable is extracted. In an alternate embodiment, the tap point assembly further including a first grommet applied onto edges of the first aperture and a second grommet applied onto edges of the second aperture. In an alternate embodiment, the tap point assembly further including a third grommet applied onto edges of the third aperture. In an alternate embodiment, the distribution cable assembly further including a boot assembly extending through the third aperture and into the drop cable passage. In an alternate embodiment, the drop cable passage includes a wall with a recess, and wherein the wall is substantially perpendicular to the interior wall. In an alternate embodiment, the recess of the wall is configured to hold a portion of the boot assembly.

In one embodiment, a method of assembling a distribution cable assembly is provided. The method of assembling a distribution cable assembly comprising: inserting a distribution cable into a first half of a tap point, wherein the distribution cable is seated in a portion of a main passage; removing a subunit cable from the distribution cable; feeding the extracted subunit cable into a portion of a drop cable passage; and coupling a second half of the tap point onto the first half of the tap point in a snap fit configuration.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 10A-10B are schematic illustrations of distribution cable assemblies in accordance with the present disclosure.

DETAILED DESCRIPTION

Various embodiments will be further clarified by examples in the description below. In general, the description relates to a distribution cable assembly that has various features to enable flexible configurations to accommodate various data center configurations.

Figure 1:
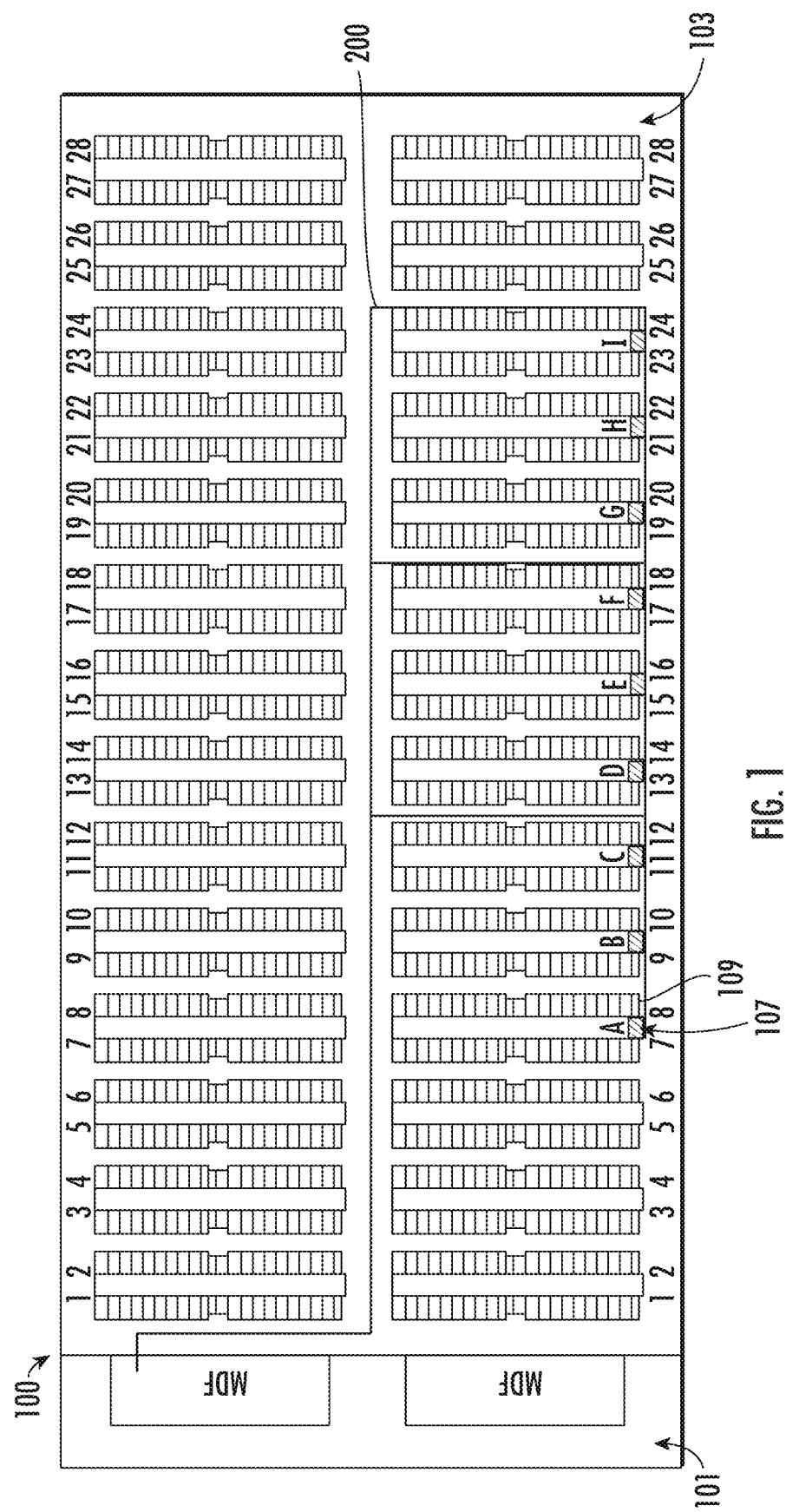
FIG. 1 is a schematic of a data center.

Referring first to FIG. 1, a schematic of a data center 100 is shown. As shown, data center 100 includes a distribution frame region 101 and a cage region 103. Distribution frame region 101 includes a main distribution frame 105 that is connected to cage region 103 as discussed herein. In particular, as shown in FIG. 1, a main distribution frame (MDF) 105 is connected to an intermediate distribution frame (IDF) 107. Intermediate distribution frames are connected to individual cabinets or servers 109 in one or more nearby rows of equipment racks within cage region 103.

Figure 2:
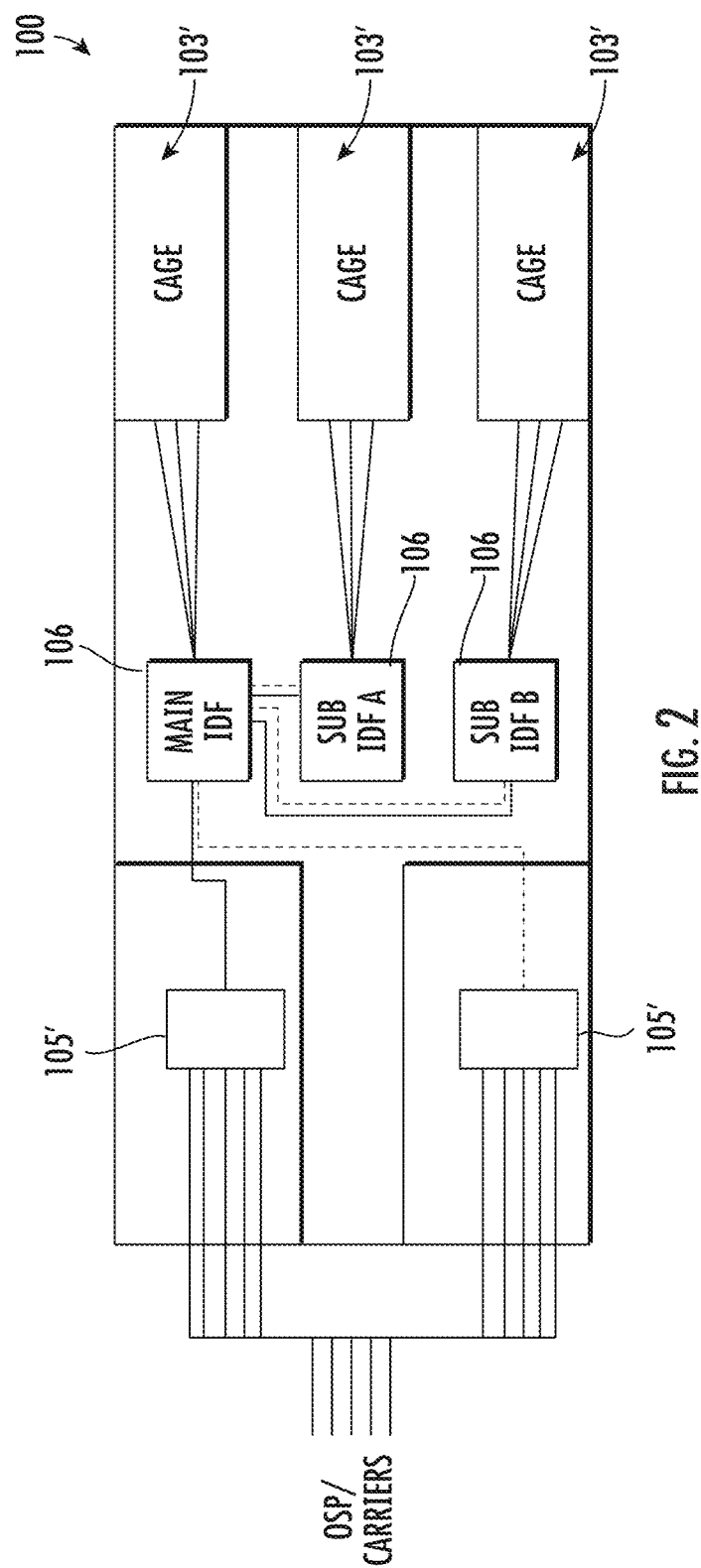
FIG. 2 is a schematic of an alternate embodiment of the data center of FIG. 1.

Referring now to FIG. 2, an alternate configuration of a data center 100' is shown. Data center 100' includes distribution frame regions 101' that each include main distribution frames 105' that are separated from each other and from cage region 103'. As shown, main distribution frames 105' are connected to information distribution frames 106, each of which are connected to each other and corresponding cage regions 103'.

To connect the above-mentioned units to each other, distribution cables are used throughout data center 100, 100'.

Figure 3A:
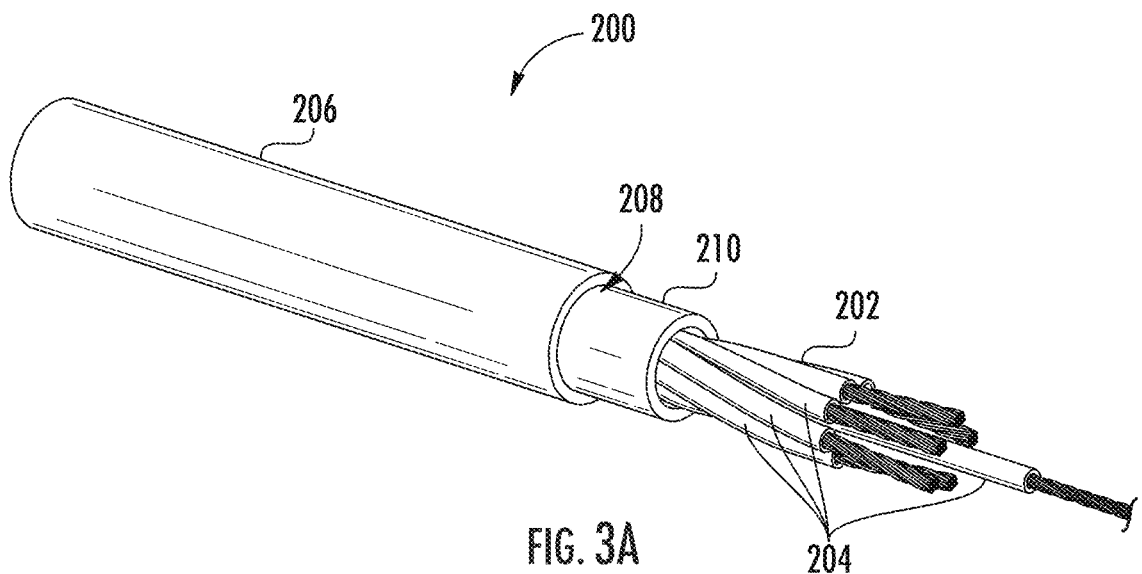
FIG. 3A is a perspective view of a section of fiber optic distribution cable, in accordance with aspects of the present disclosure.
Figure 3B:
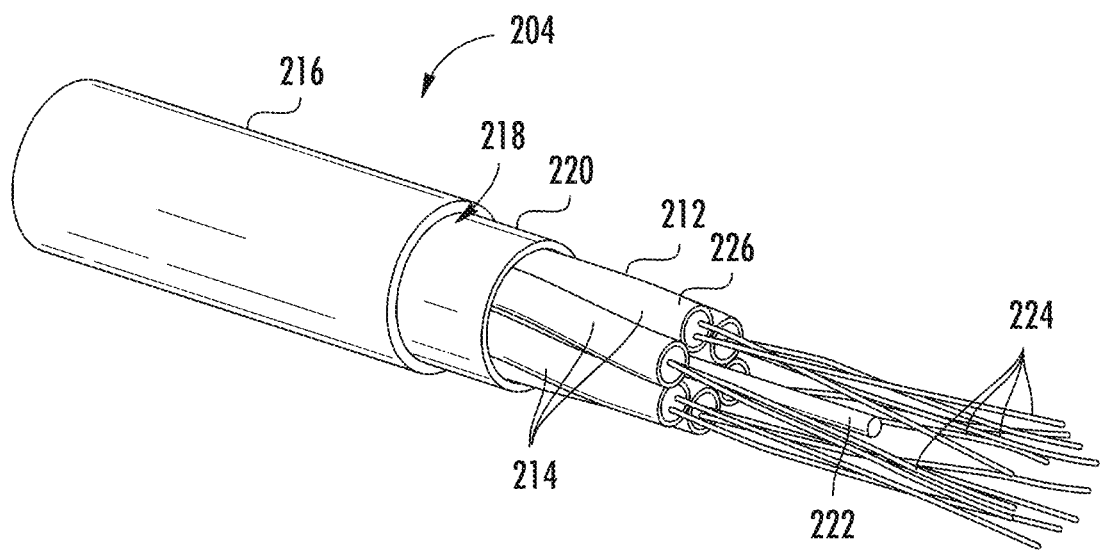
FIG. 3B is a perspective view of a section of a subunit cable of the distribution cable of FIG. 3A, in accordance with aspects of the present disclosure.

FIGS. 3A-3B are views of a section of an example distribution cable 200, in accordance with aspects of the present disclosure. Referring to FIG. 3A, the distribution cable 200 includes a cable bundle 202 (may also be referred to herein as a cable core) of a plurality of subunit cables 204 and a distribution jacket 206 (may also be referred to as outer jacket, subunit jacket, etc.) defining a distribution interior 208. The cable bundle 202 of the subunit cables 204 is disposed in the distribution interior 208 of the distribution jacket 206.

In certain embodiments, a strain-relief component 210 may be disposed within the distribution interior 208 of the distribution jacket 206 between the cable bundle 202 of the subunit cables 204 and the distribution jacket 206. The strain-relief component 210 surrounds and/or is interspersed among the cable bundle 202 of the subunit cables 204.

In certain embodiments, an outer layer of a plurality of subunit cables 204 is stranded around an inner layer of subunit cables 204 to provide higher fiber densities. This reduces any stress or strain concentrations on any single subunit cable 204 (e.g., from bending of the distribution cable 200). In certain embodiments, a central strength element (not shown) may be provided, and the subunit cables 204 may be stranded around the central strength element. In yet other cable applications, stranding may not be used and the subunit cables 204 may run substantially parallel through the distribution cable 200.

Referring to FIG. 3B, each subunit cable 204 (may also be referred to herein as a micro module, etc.) includes a subunit bundle 212 (may also be referred to herein as a subunit core) of a plurality of tether cables 214 (may also be referred to herein as tether subunits) and a subunit jacket 216 defining a subunit interior 218. The subunit bundle 212 of the tether cable 214 is disposed in the subunit interior 218 of the subunit jacket 216.

In certain embodiments, a strain-relief component 220 may be disposed within the subunit interior 218 of the subunit jacket 216 between the subunit bundle 212 of the tether cables 214 and the subunit jacket 216. The strain-relief component 220 surrounds and/or is interspersed among the subunit bundle 212 of the subunit cables 204. In certain embodiments, the strain-relief component 220 may be, for example, a layer of longitudinally-extending yarns for absorbing tensile loads on the subunit bundle 212. In certain embodiments, the strain-relief component 220 includes a dispersed layer of aramid strands in the region between the subunit jacket 216 and the subunit bundle 212 of tether cables 214.

In certain embodiments, a central strength element 222 may be disposed in a center of the subunit bundle 212, and thereby, within the subunit interior 218 of the subunit jacket 216. The tether cables 214 may be stranded (e.g., helically twisted) around the central strength element 222. In certain embodiments, an outer layer of a plurality of tether cables 214 is stranded around an inner layer of tether cables 214 to provide higher fiber densities. In yet other cable applications, stranding may not be used and the tether cables 214 may run substantially parallel through the subunit cable 204. The central strength element 222 provides strain-relief and absorbs loads from the tether cables 214.

In certain embodiments, as illustrated, the subunit bundle 212 is stranded such that the tether cables 214 are helically twisted around a longitudinal axis of the subunit bundle 212. This reduces any stress or strain concentrations on any one tether cable 214 (e.g., from bending of the distribution cable 200 and/or subunit cable 204). Each tether cable 214 includes one or more optical fibers 224 (may also be referred to herein as optical fiber waveguides).

In certain embodiments, the strain-relief component 210 and/or strain-relief component 220 may utilize tensile yarns as tension relief elements that provide tensile strength to the cables 200, 204, 214. In certain embodiments, a preferred material for the tensile yarns is aramid (e.g., KEVLAR®), but other tensile strength materials could be used, such as high molecular weight polyethylenes (e.g., SPECTRA® fiber and DYNEEMA® fiber, Teijin Twaron® aramids, fiberglass, etc.).

Figure 3C:
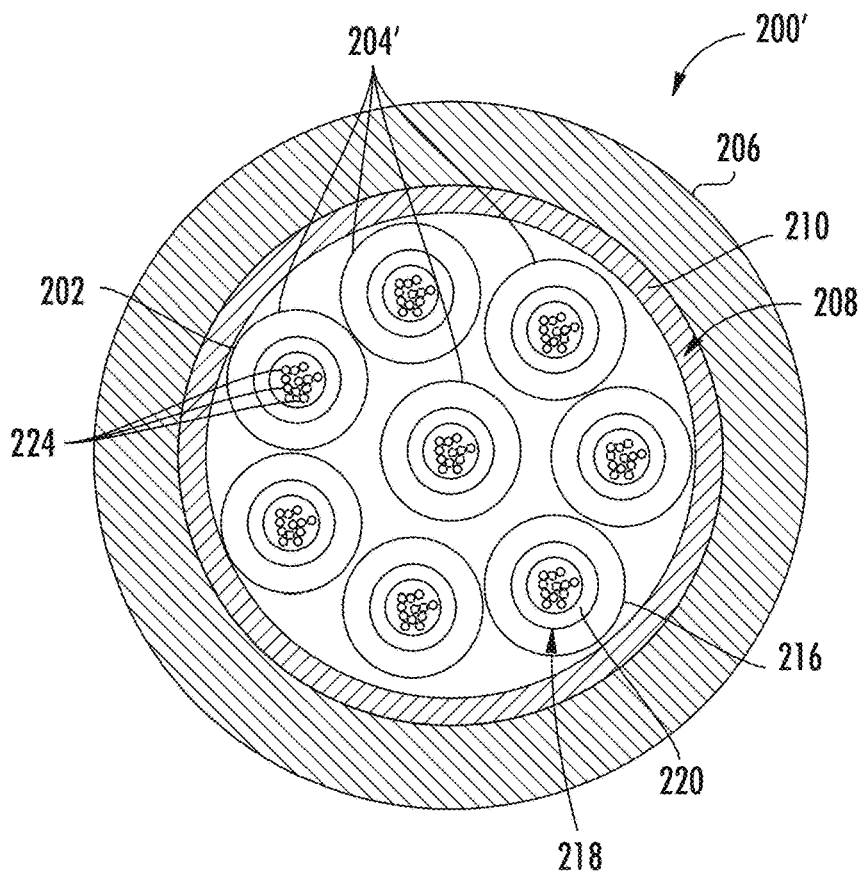
FIG. 3C is a cross-sectional view of an embodiment of the distribution cable of FIGS. 3A-3B, in accordance with aspects of the present disclosure.
Figure 3D:
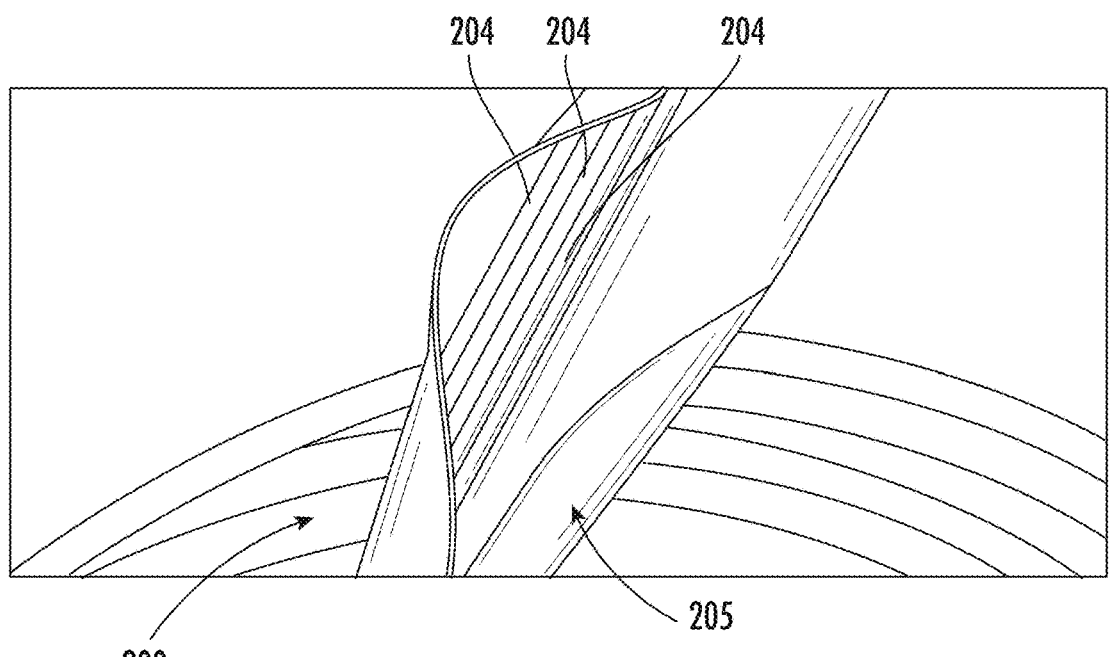
FIG. 3D is a perspective view of a distribution cable and interior subunit cables in accordance with the present disclosure.

Referring briefly to FIG. 3D, an embodiment of distribution cable 200 is shown in accordance with aspects of the present disclosure. As shown in FIG. 3D, distribution cable 200 includes a distribution jacket 206 that defines distribution interior 208 in which a cable bundle 202 of a plurality of subunit cables 204 are housed. Also, as shown, distribution cable 200 does not include strain relief component 210 thereby allowing direct access to the plurality of subunit cables 204 beneath distribution jacket 206 as discussed below. Distribution cable 200 is made of a mesh material that is wrapped around plurality of subunit cables 204. Advantageously, the mesh material of distribution cable 200 provides flexibility to distribution cable 200 such that distribution cable 200 can accommodate different numbers of subunit cables depending on application and cabling requirements. Additionally, distribution cable 200 has a perforation 205 upon which distribution cable 200 can be opened as shown in FIG. 3D to access subunit cables 204 and to route one of subunit cables 204 within tap point 320 (FIG. 6C) as discussed below. Moreover, the mesh material of distribution cable 200 can be various colors, which can assist in field installation. For example, different colors could identify different information distribution frames 107 or cabinets 109 to which distribution cable 200 is associated.

FIG. 3C is a cross-sectional view of an embodiment of a distribution cable 200' of FIGS. 3A-3B, in accordance with aspects of the present disclosure. Each of the subunit cables 204' includes optical fibers 224 loosely disposed within the subunit cable 204' (e.g., in an essentially parallel array). The subunit cable 204' may be further encased in an interlocking armor for enhanced crush resistance.

Figure 4:
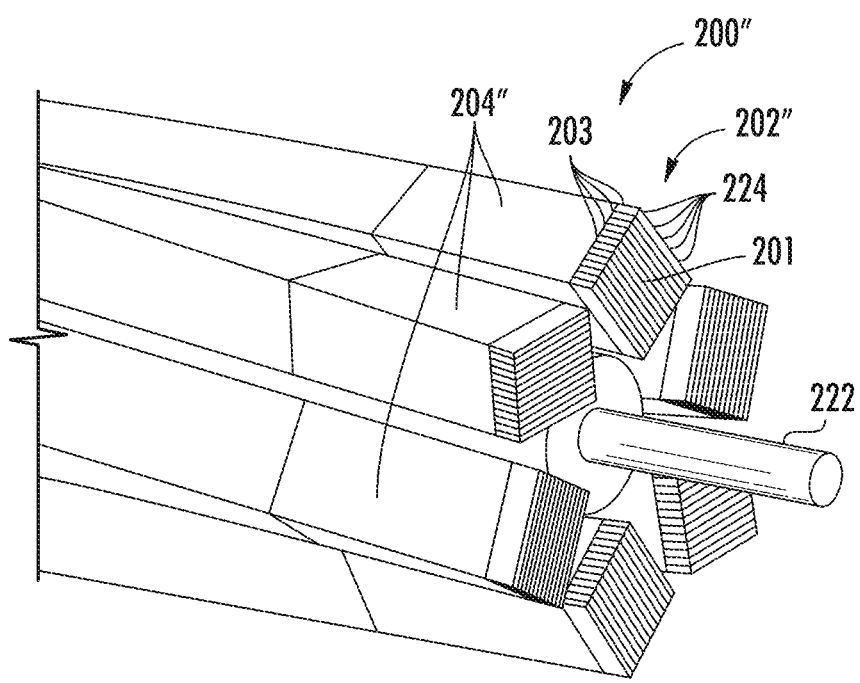
FIG. 4 is a cross-sectional view of another embodiment of the distribution cable of FIGS. 3A-3B, in accordance with aspects of the present disclosure.

FIG. 4 is a cross-sectional view of another embodiment of a distribution cable 200". Each of the subunit cables 204" of the cable bundle 202" is a stack 201 of fiber ribbons 203. Each fiber ribbon 203 includes a plurality of optical fibers 224.

Figure 5A:
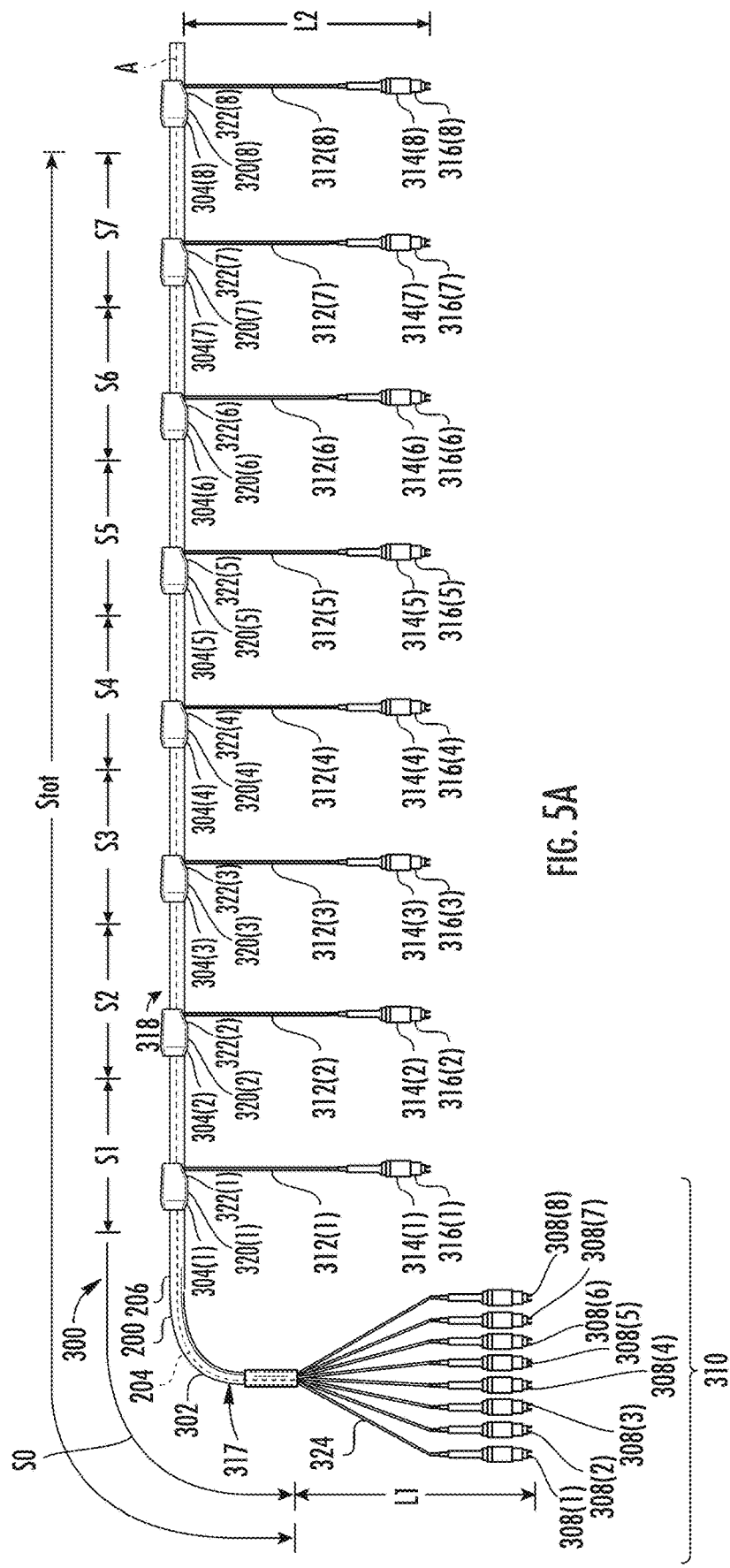
FIG. 5A is a schematic view of an embodiment of a preconnectorized distribution cable assembly, including the distribution cable of FIGS. 3A-4B and illustrating a distribution tether with MPO connectors and eight subunit cables with MPO connectors.
Figure 5B:
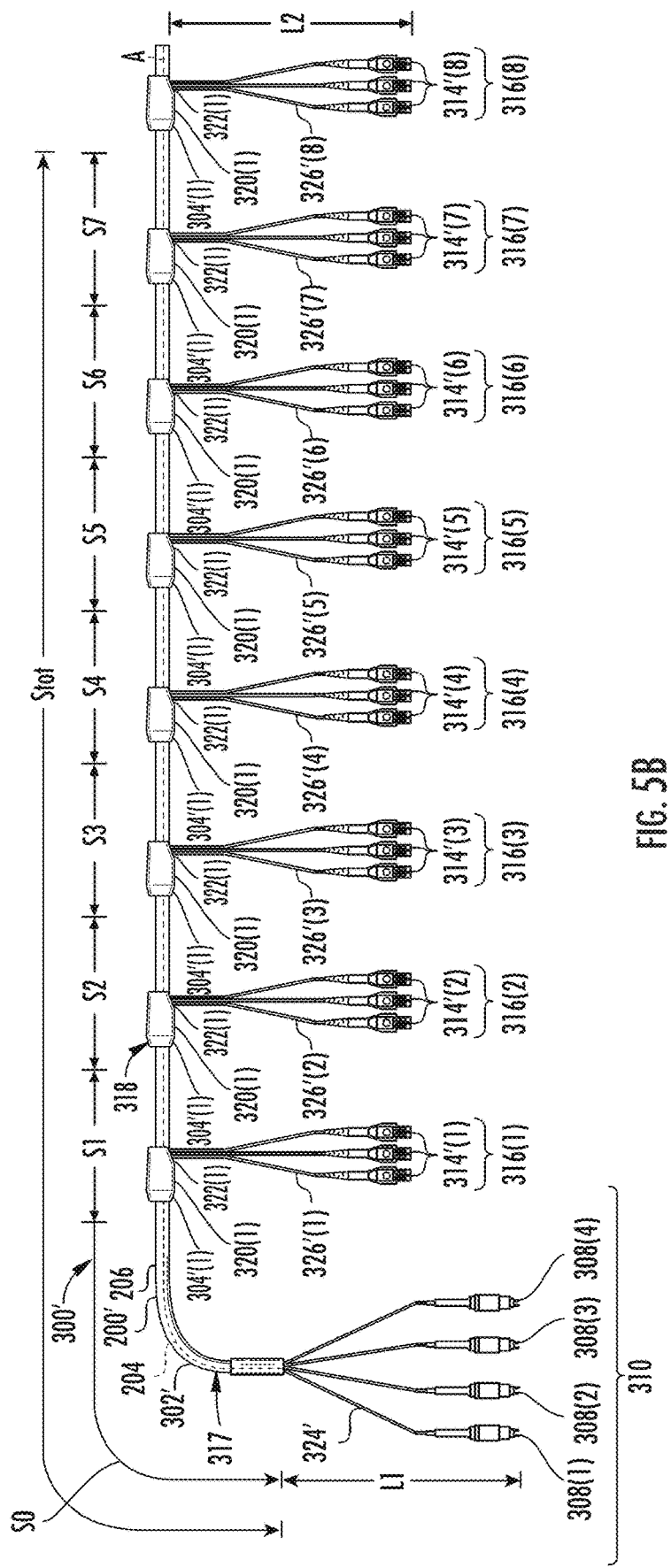
FIG. 5B is a schematic view of another embodiment of a preconnectorized distribution cable assembly, including the distribution cable of FIGS. 3A-4 and illustrating a distribution tether with MTP connectors and eight tether subunits with LC uniboot connectors.
Figure 5C:
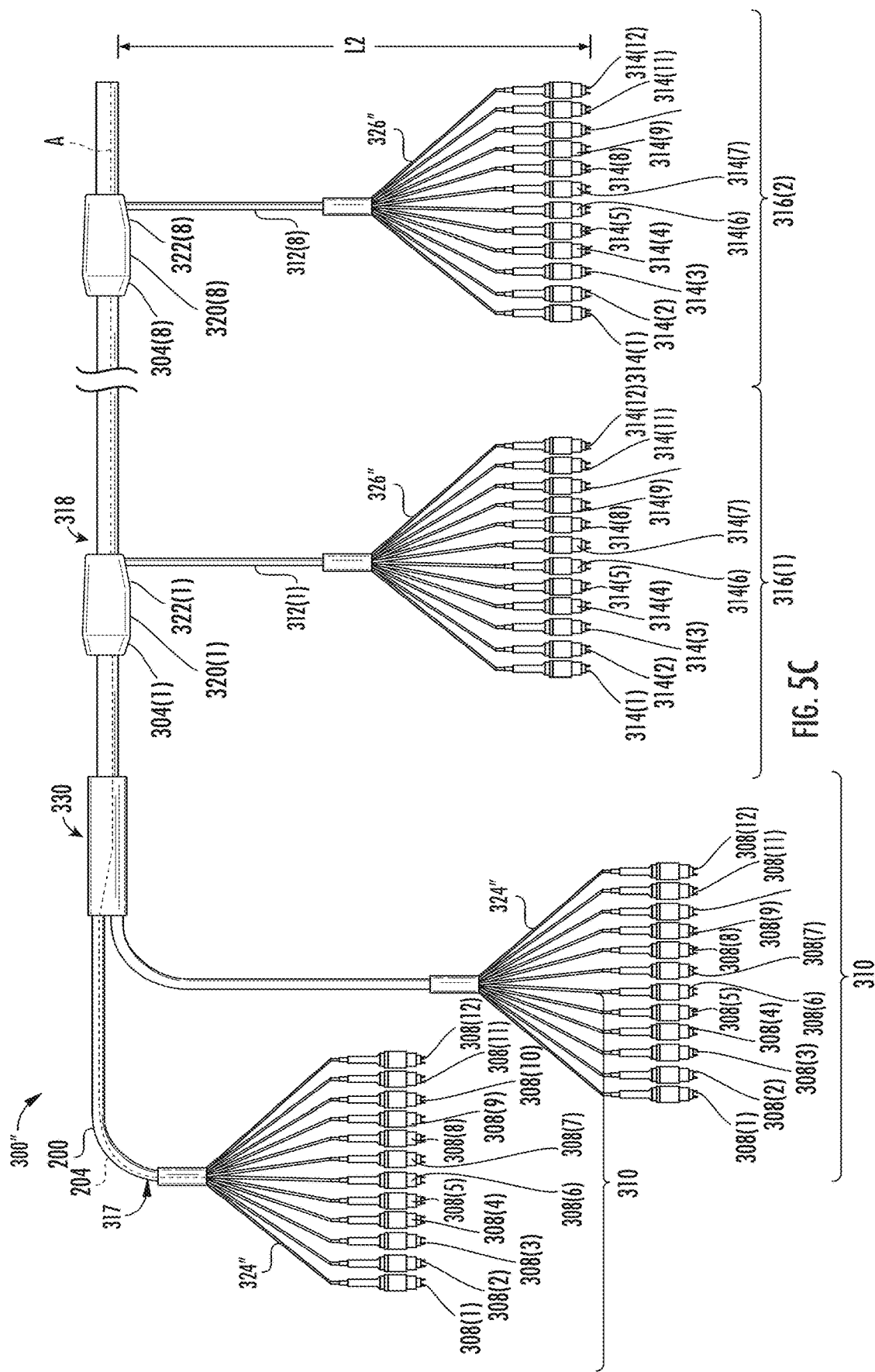
FIG. 5C is a schematic view of another embodiment of a preconnectorized distribution cable assembly, including the distribution cable of FIGS. 3A-4B and illustrating multiple distribution tethers and multiple tap tethers.

FIGS. 5A-5C are embodiments of a distribution cable assembly 300 incorporating the distribution cable of FIGS. 3A-3D. Referring to FIG. 5A, the distribution cable assembly 300 includes a distribution subunit 302 (may also be referred to herein as a main subassembly) and a plurality of tap subunits 304(1)-304(8) (may also be referred to herein as a branch subassembly, drop subunit, etc.). The distribution subunit 302 includes a distribution cable 200 (may be referred to as a distribution cable portion) and distribution connectors 308 at a distribution end 310 (may also be referred to herein as upstream end). Each of the plurality of tap subunits 304(1)-304(8) includes a tap cable 312(1)-312(8) (may also be referred to herein as a drop cable or tap cable portion) and tap connectors 314(1)-314(8) at a tap end 316(1)-316(8) (may also be referred to herein as downstream end). In certain embodiments, subunit cables 204 extend from the distribution connector 308 to respectively one of the plurality of tap connectors 314(1)-314(8), each at a different tap point 320(1)-320(8) (may also be referred to herein as drop point, terminated access point, etc.) along a length of the distribution cable 200. For example, subunit cable 204 extends from the distribution connector 308 through the distribution cable 200 to the tap connector 314(2). The spacing S1-S7 between tap points 320(1)-320(8) depends on the application and cabling requirements and can be adjusted as described below.

Figure 6A:
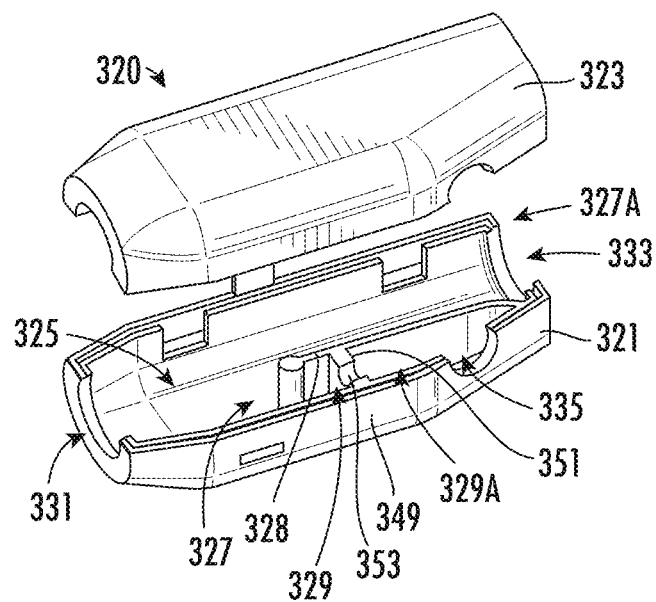
FIG. 6A is an exploded perspective view of a tap point in accordance with the present disclosure.
Figure 6B:
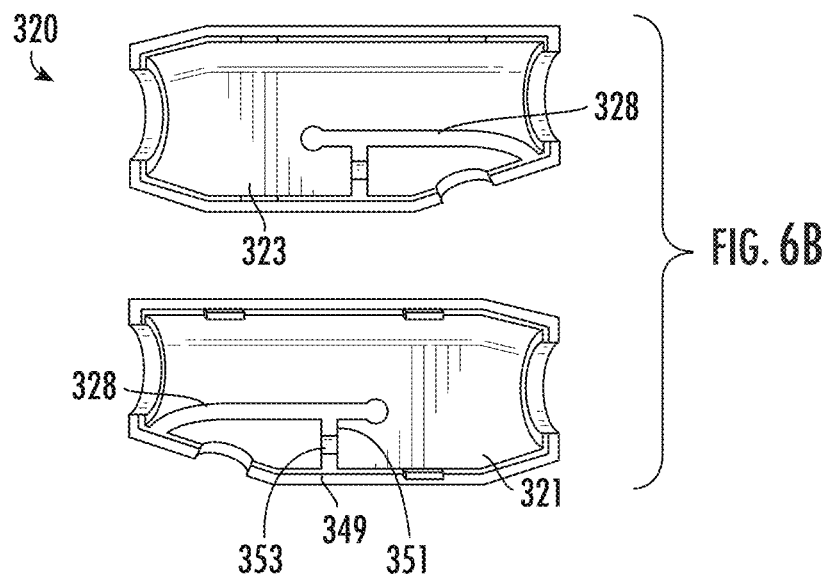
FIG. 6B is a top view of the tap point of FIG. 6A illustrating an interior of the tap point of FIG. 6A.
Figure 6C:
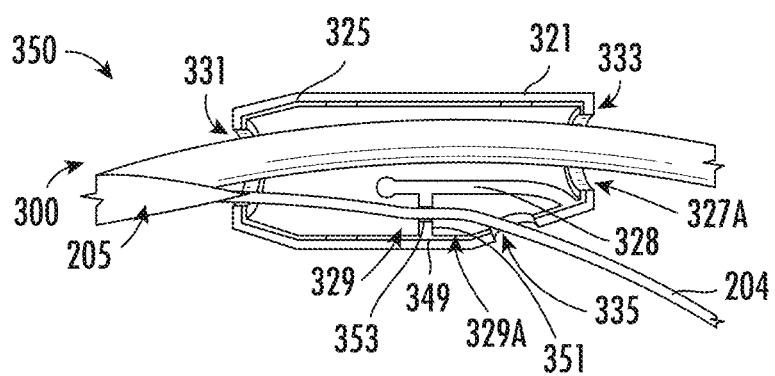
FIG. 6C is a top view of a half of a tap point assembly in accordance with the present disclosure.
Figure 6D:
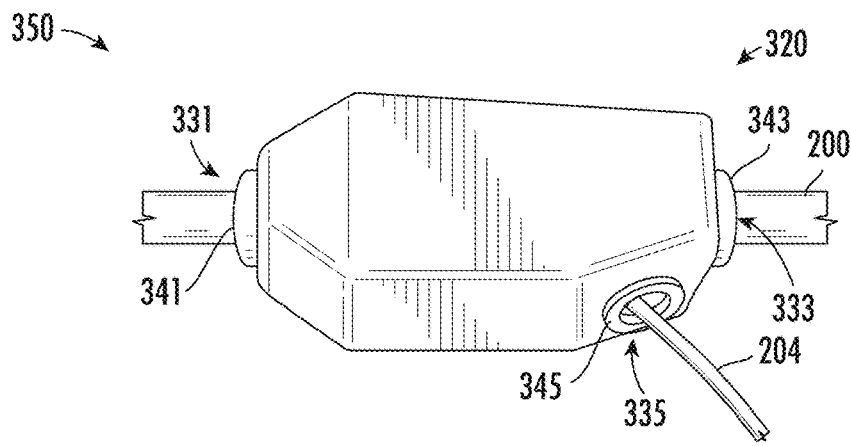
FIG. 6D is a perspective view of the tap point assembly of FIG. 6C as assembled.

Referring briefly to FIGS. 6A-6D, a tap point 320 and a tap point assembly 350 respectively are shown. Tap point 320 is configured to route distribution cable 200 through tap point 320 such that a subunit cable 204 can be extracted from distribution cable 200 (through perforation 205) and routed through tap point 320 to form a drop cable or tap cable 312 as shown in FIG. 6C. As shown, tap point 320 comprises a first half 321 and a second half 323 that couple to each other to define an interior 325. In some embodiments, first half 321 and second half 323 are coupled to each other by corresponding latch 337 and grooves 339 provided on first half 321 and second half 323 that fit in a snap fit configuration. However, it is within the scope of the present disclosure that alternate coupling methods may be used. Advantageously, the snap fit of tap point 320 enables mobility of tap point 320 along a longitudinal axis A of distribution cable 200 which enables flexibility in cable installation onto a server or information data frame in a cage region of a data center. For example, if cabinets 109 are spaced apart a greater distance than anticipated, halves 321, 323 of tap points 320 are decoupled and moved along longitudinal axis A of distribution cable 200 to increase or decrease spacings S1-S7 between tap points 320 such that the spacing between tap points 320 can accommodate the corresponding distance/spacing between cabinets 109 in cage region 103. In some embodiments, spacing S1-S7 ranges between 600 mm and 800 mm. Advantageously, the spacing S1-S7 can be adjusted in accordance to customer requirements such that in some embodiments, spacing S1-S7 can be greater than or equal to 600 mm or less than or equal to 600 mm. In addition, the number of tap points 320 on distribution cable assembly 300 can be adjusted based on the application and cabling requirements. In particular, the snap fit configuration of tap point 320 enables easy addition and removal of tap points along distribution cable 200 to accommodate various data center configurations during installation. In some embodiments, distribution cable assembly 300 has a number of tap points 320 ranging between 1 and 10, or between 6 and 8. Advantageously, similar to spacing S1-S7, the number of tap points 320 can be adjusted in accordance to customer requirements such that in some embodiments, the number of tap points 320 can be outside the stated ranges above.

In some embodiments, tap point 320 is made of a plastic material such as polycarbonate (PC)+acrylonitrile butadiene styrene (ABS) or polyetherimide (e.g., ULTEM®) or polyethersulfone (PESU). However, it is contemplated that in alternate embodiments, alternate materials may be used, such as metal for example.

Interior 325 comprises a main passage 327 and a drop cable passage 329. Main passage 327 is defined between aperture 331 and aperture 333 of tap point 320 and is configured to receive and allow distribution cable 200 to pass through tap point 320. That is, main passage 327 has a width that corresponds to a width of distribution cable 200 such that distribution cable 200 can be seated within main passage 327.

As shown in FIG. 6C, tap point assembly 350 comprises tap point 320 where distribution cable 200 is seated within main passage 327, and subunit cable 204 is extracted from distribution cable 200 (through perforation 205) and inserted into and through drop cable passage 329.

Drop cable passage 329 is an off shoot of main passage 327 and is defined by interior wall 328, which physically separates main passage 327 from drop cable passage 329 and provides structural reinforcement onto tap point 320 and distribution cable 200. Drop cable passage 329 leads to aperture 335 where tap cable 312 exits tap point 320. In some embodiments, as shown, a wall 351 is provided with a recess 353 where wall 351 is substantially perpendicular to interior wall 328, and wall 351 divides drop cable passage 329 into at least a portion 329A as described below. Recess 353 provides a mounting surface for tap cable 312 to rest within drop cable passage 329. In some embodiments, recess 353 provides a mounting surface to which a strain relief structure (e.g., a boot assembly 347, FIG. 7B) can engage as discussed below.

Figure 7A:
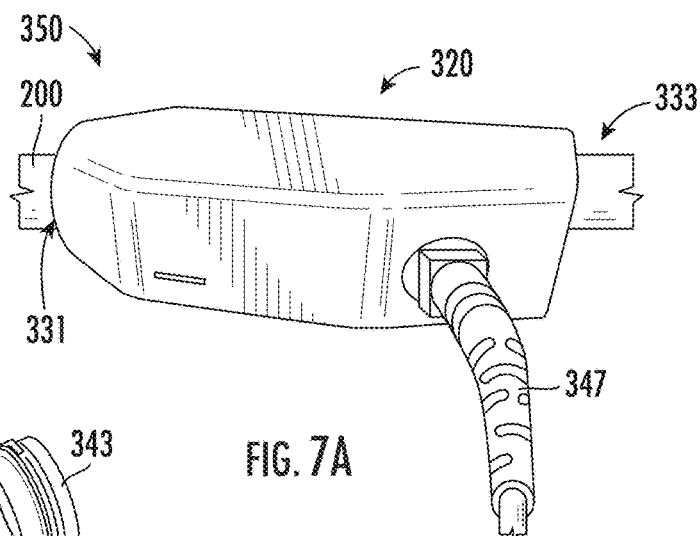
FIG. 7A is a perspective view of an alternate embodiment of the tap point assembly of FIG. 6D.
Figure 7B:
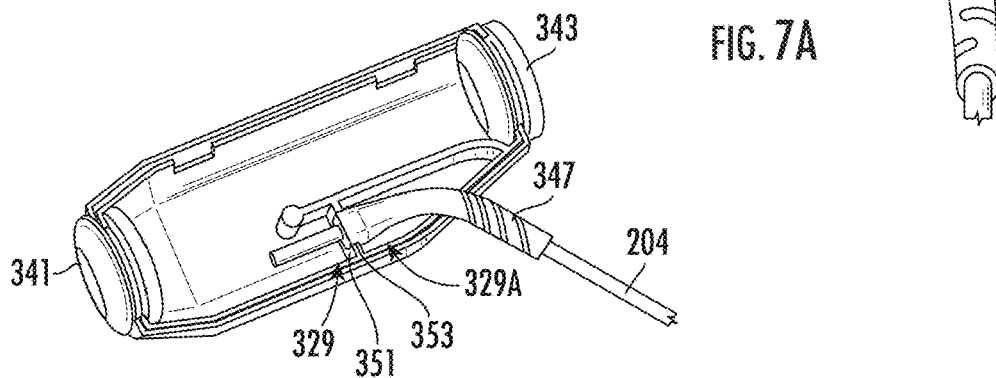
FIG. 7B is a partial exploded view of the tap point assembly of FIG. 7A.
Figure 8:
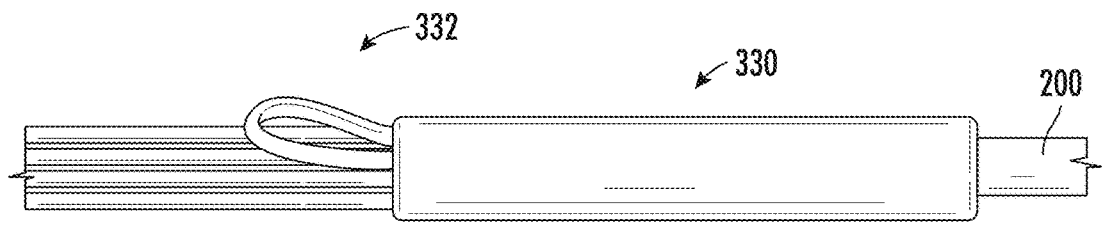
FIG. 8 is a perspective view of a pulling grip in accordance with the present disclosure.

Referring now to FIGS. 7A and 7B, in some embodiments, tap point 320 includes grommets 341, 343, and 345 coupled to apertures 331, 333, and 335 respectively to provide strain relief onto both distribution cable 200 and corresponding tap cable 312. Similarly, in an alternate embodiment, as shown in FIGS. 8A and 8B, tap point 320 includes grommets 341, 343 on apertures 331, 333, respectively to provide strain relief onto distribution cable 200. However, as shown, subunit cable 204 and tap cable 312 are provided with a boot assembly 347 that inserts through aperture 335 and into drop cable passage 329. As shown, boot assembly 347 extends into drop cable passage 329 and engages with the mounting surface provided by recess 353 of wall 351 thereby holding tap cable 312 in place with limited mobility. In some embodiments, boot assembly 347 extends into drop cable passage 329 and engages with interior wall 328 and a side wall 349 of tap point 320 to hold tap cable 312 in place with limited mobility. Boot assembly 347 is configured to provide strain relief and improved retention (i.e., improved retention force) onto subunit cable 204 and tap cable 312 exiting tap point 320. In alternate embodiments, a heat shrink material may be used to provide similar strain relief as boot assembly 347. In some embodiments, grommets 341, 343, and 345 are made of silicon rubber or a thermoplastic elastomer.

Referring back to FIG. 5A, distribution connectors 308(1)-308(8) are in optical communication with the tap connectors 314(1)-314(8) (may be referred to generally as tap connectors 314), where the distribution cable assembly 300 is pre-connectorized, such as for connection to a patch panel (e.g., at intermediate distribution frame 105). The distribution cable assembly 300 includes a distribution portion 317 of the subunit cable 204 that extends for a predetermined length S0 from the distribution connectors 308(1)-308(8) through the distribution cable 200 to the first tap portion 318. The distribution cable assembly 300 further includes tap portions 318 of the subunit cable 204 that extend from the distribution cable 200 to the tap connectors 314(1)-314(8). Accordingly, the total length Stot of the distribution cable 200 includes S0-S7.

In certain embodiments, as illustrated in FIG. 5A, the distribution subunit 302 includes a distribution tether 324 (may be referred to as a distribution tether portion) at the distribution end 310. In certain embodiments, the distribution cable assembly 300 includes multiple distribution tethers 324 and multiple tap tethers. The distribution tether 324 may be pre-connectorized and extend a predetermined length L1 from an end 325 of the distribution jacket 106. Further, the distribution tether 324 includes distribution connectors 308(1)-308(8) coupled to ends of the distribution tether 324. Similarly, the tap subunits 304(1)-304(8) are pre-connectorized such that the tap cables 312(1)-312(8) extend a predetermined length L2 from the distribution jacket 106. Further, the tap subunits 304(1)-304(8) include tap connectors 314(1)-314(8) coupled to tap ends 316(1)-316(8) of the tap subunits 304(1)-304(8). In some embodiments, length L1 and length L2 can be the same length. In some embodiments, lengths L2 are the same length among tap connectors 314 as shown in FIGS. 10A and 10B. In alternate embodiments, lengths L1, L2 are different. In some embodiments, lengths L1 among distribution tethers 324 vary as shown in FIGS. 5C and 10B. Stated another way, lengths L1 among tap cables 312(1)-312(8) may vary depending on the application and cabling requirements. In some embodiments, lengths L2 among tap cables 312(1)-312(8) vary. Stated another way, lengths L2 among tap cables 312(1)-312(8) may vary depending on the application and cabling requirements. For example, length L2 of tap cable 312(1) may be different than length L2 of tap cable 312(2)-312(8). Such variability of lengths L2 enables distribution cable assembly 300 to have flexibility in application depending on the configuration of data center 100, 100'. In some embodiments, length L2 has a length ranging between about 100 mm and about 300 mm. Advantageously, similar to spacing S1-S7 and number of tap points 320, lengths L1 and L2 can be adjusted or modified in accordance to data center 100, 100' construction specifications (i.e., height and size of data centers 100, 100') such that lengths L1 and L2 can be greater than or less than the stated ranges above.

In certain embodiments, as illustrated in FIG. 5B, the distribution cable assembly 300' includes the distribution subunit 302' with a distribution tether 324' at the distribution end 310, which is pre-connectorized. Further, the tap subunits 304'(1)-304'(8) includes tap tethers 326'(1)-326'(8) at the tap ends 316'(1)-316'(8), which is pre-connectorized with tap connectors 314'(1)-314'(8).

FIG. 5C is a schematic view of another embodiment of a preconnectorized distribution cable assembly 300" illustrating multiple distribution tethers 324" and multiple tap tethers 326". Such configurations may be used to increase fiber density and/or for certain routing configurations, such as by routing each distribution tether 324" to each tap tether 326". The distribution connectors 308(1)-308(12) of the distribution tethers 324" are in optical communication with the tap connectors 314(1)-314(2) of the tap tethers 326".

Figure 9A:
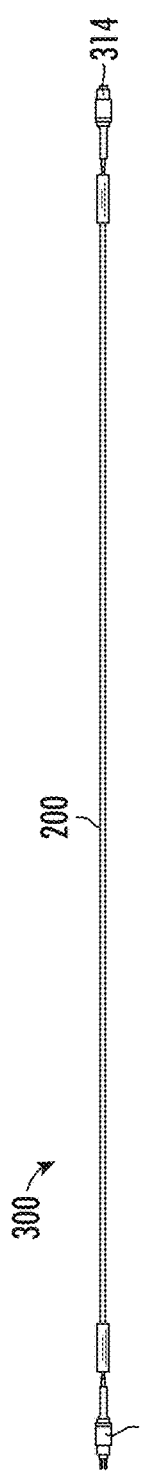
FIGS. 9A-9C are schematic illustrations of distribution cables in accordance with the present disclosure.
Figure 9B:
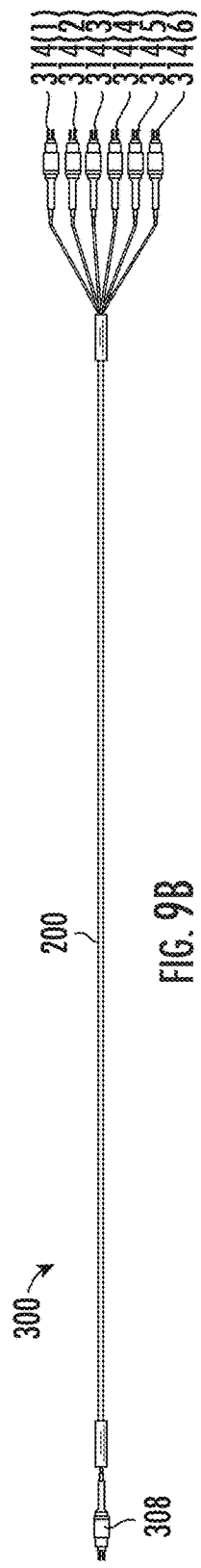
Figure 9C:
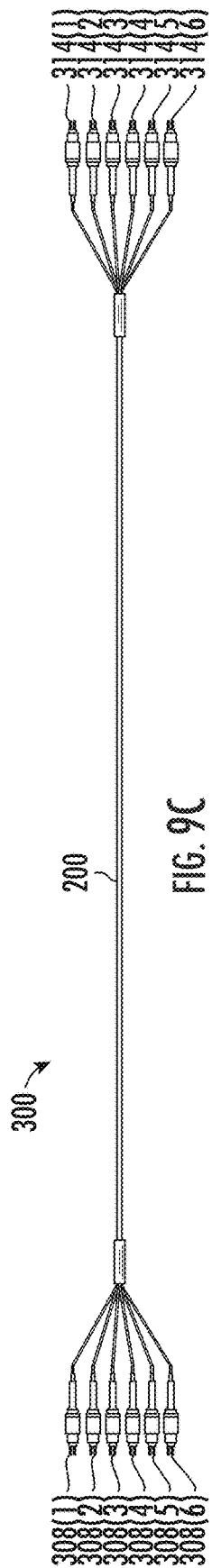

As shown in FIGS. 5A-5C, tap connectors 314, 314' and distribution connectors 308 are shown as MTP connectors. However, it is within the scope of the present disclosure that alternate connectors may be used, such as SC or LC, for example. In some embodiments, tap connectors 314, 314' and distribution connectors 308 are the same types of connectors as shown in FIGS. 9A and 9C. In some embodiments, tap connectors 314, 314' and distribution connectors 308 are different types of connectors as shown in FIG. 9B. In other embodiments, tap connectors 314, 314' and distribution connectors 308 are each different types of connectors. In another embodiment, individual connectors of tap connectors 314, 314' are different. In another embodiment, individual connectors of distribution connectors 308 are each different types of connectors.

To assemble distribution cable assembly 300, distribution cable 200 is inserted into a half 327A of main passage 327 of first half 321 of tap point 320. Then, a subunit cable 204 housed within distribution cable 200 is extracted through perforation 205 of distribution cable 200, and the extracted subunit cable 204 is fed into a portion 329A of drop cable passage 329. Then, a second half 323 of tap point 320 is coupled to first half 321 of tap point 320 to assemble tap point assembly 350 onto distribution cable assembly 300.

To move distribution cable assembly 300 throughout data center 100, 100', a pulling grip 330 is provided on distribution cable 200 as shown in FIG. 9. In particular, pulling grip 330 is provided between distribution end 310 and tap cables 312, and pulling grip 330 provides a handle 332 onto which a user can grab and apply a pulling force to move distribution cable 300 through data center 100, 100'. In some embodiments, pulling grip 330 is made of a heat shrink material. However, it is within the scope of the present disclosure that pulling grip 330 can be made of other suitable materials such as a hot melt resin resulting from a low pressure molding process, for example. In some embodiments, pulling grip 330 provides a pulling force ranging between about 150 N and 200 N for the heat shrink material or between about 400 N to about 450 N for the low pressure molded hot melt resin.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A distribution cable assembly, comprising:
   a distribution cable having a distribution end and a plurality of subunit cables within the distribution cable;
   a plurality of tap points positioned along a length of the distribution cable, wherein the plurality of tap points are each configured to route one of the plurality of subunit cables away from a remainder of the plurality of subunit cables to form a respective tap cable and the plurality of tap points are spaced apart in a first configuration;
   wherein the plurality of tap points are adjustable such that the plurality of tap points are spaced apart in a second configuration that is different than the first configuration.

2. The distribution cable assembly of claim 1, wherein the plurality of tap points are adjustable such that a first quantity of the plurality of tap points is changed to a second quantity of the plurality of tap points, wherein the second quantity is different than the first quantity.

3. The distribution cable assembly of claim 1, wherein each tap point of the plurality of tap points comprises a first half and a second half, wherein the first half and the second half couple to each other in a snap fit configuration to define a main passage and a drop cable passage separated by an interior wall.

4. The distribution cable assembly of claim 3, wherein each tap point of the plurality of tap points includes a first aperture, a second aperture, and a third aperture wherein the first aperture and the second aperture define the main passage, and wherein the third aperture and the interior wall define the drop cable passage.

5. The distribution cable assembly of claim 4, further including a first grommet applied onto edges of the first aperture and a second grommet applied onto edges of the second aperture.

6. The distribution cable assembly of claim 5, further including a third grommet applied onto edges of the third aperture.

7. The distribution cable assembly of claim 4, further including a boot assembly extending through the third aperture and into the drop cable passage.

8. The distribution cable assembly of claim 1, wherein each tap point of the plurality of tap points routes a respective subunit cable to form a respective a tap cable, and wherein each tap cable has a respective length.

9. The distribution cable assembly of claim 8, wherein at least one of the respective lengths of the tap cables are different with respect to the respective length of another tap cable.

10. The distribution cable of claim 1, wherein the distribution cable assembly further comprises:
    a pulling grip positioned between the distribution end and the plurality of tap points.

11. The distribution cable assembly of claim 1, wherein the distribution cable comprises a mesh material having perforations through which at least one subunit cable of the plurality of subunit cables is fed through.

12. A tap point assembly comprising:
a tap point comprising:
a first half;
a second half coupled to the first half in a snap fit configuration to define an interior of the tap point;
a main passage defined by the first half and the second half, wherein the main passage terminates at a first aperture and a second aperture;
an interior wall within the interior of the tap point, the interior wall defining a drop cable passage terminating at a third aperture;
a distribution cable seated in the main passage from the first aperture to the second aperture, wherein the distribution cable includes at least one subunit cable within an interior of the distribution cable; and
a tap cable exiting the third aperture of the tap point, wherein the tap cable is formed by a subunit cable of the at least one subunit cable that is extracted from the distribution cable and seated within the drop cable passage,
wherein the tap point assembly is movable along a longitudinal axis of the distribution cable.

13. The tap point assembly of claim 12, wherein the distribution cable comprises a mesh material and having a perforation through which the subunit cable that forms the tap cable is extracted.

14. The tap point assembly of claim 12, further including a first grommet applied onto edges of the first aperture and a second grommet applied onto edges of the second aperture.

15. The tap point assembly of claim 14, further including a third grommet applied onto edges of the third aperture.

16. The tap point assembly of claim 15, further including a boot assembly extending through the third aperture and into the drop cable passage.

17. The tap point assembly of claim 12, wherein the drop cable passage includes a wall with a recess, and wherein the wall is substantially perpendicular to the interior wall.

18. The tap point assembly of claim 17, wherein the recess of the wall is configured to hold a portion of the boot assembly.

19. A tap point assembly comprising:
a tap point comprising:
a first half;
a second half coupled to the first half in a snap fit configuration to define an interior of the tap point;
a main passage defined by the first half and the second half, wherein the main passage terminates at a first aperture and a second aperture;
an interior wall within the interior of the tap point, the interior wall defining a drop cable passage terminating at a third aperture;
a distribution cable seated in the main passage from the first aperture to the second aperture, wherein the distribution cable includes at least one subunit cable within an interior of the distribution cable; and
a tap cable exiting the third aperture of the tap point, wherein the tap cable is formed by a subunit cable of the at least one subunit cable that is extracted from the distribution cable and seated within the drop cable passage,
wherein the distribution cable comprises a mesh material and having a perforation through which the subunit cable that forms the tap cable is extracted.

20. The tap point assembly of claim 19, further including a first grommet applied onto edges of the first aperture and a second grommet applied onto edges of the second aperture.

21. The tap point assembly of claim 20, further including a third grommet applied onto edges of the third aperture.

22. The tap point assembly of claim 21, further including a boot assembly extending through the third aperture and into the drop cable passage.

23. The tap point assembly of claim 19, wherein the drop cable passage includes a wall with a recess, and wherein the wall is substantially perpendicular to the interior wall.

24. The tap point assembly of claim 23, wherein the recess of the wall is configured to hold a portion of the boot assembly.

* * * * *

UNITED STATES PATENT AND TRADEMARK OFFICE
CERTIFICATE OF CORRECTION

| | | |
|---|---|---|
| PATENT NO. | : 11,880,082 B2 | |
| APPLICATION NO. | : 17/723789 | |
| DATED | : January 23, 2024 | |
| INVENTOR(S) | : Songhua Cao et al. | |

It is certified that error appears in the above-identified patent and that said Letters Patent is hereby corrected as shown below:

On the Title Page

Under item (65), in Column 1, in "Prior Publication Data", Line 2, below "Nov. 3, 2022" insert
-- (30) Foreign Application Priority Data
Apr. 29, 2021 (WO) ........ PCT/CN21/90996 --, as a new field entry.

Signed and Sealed this
Fourth Day of June, 2024

Katherine Kelly Vidal
*Director of the United States Patent and Trademark Office*